(12) United States Patent
Roger et al.

(10) Patent No.: US 11,351,506 B2
(45) Date of Patent: Jun. 7, 2022

(54) AIR BUBBLE GENERATION DEVICE

(71) Applicant: MEIDENSHA CORPORATION, Tokyo (JP)

(72) Inventors: Yin Qiang Roger, Jalan Pesawat (SG); Hiroshi Noguchi, Jalan Pesawat (SG); Terutake Niwa, Jalan Pesawat (SG); Osamu Takase, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 38 days.

(21) Appl. No.: 16/971,176

(22) PCT Filed: Dec. 6, 2018

(86) PCT No.: PCT/JP2018/044824
§ 371 (c)(1),
(2) Date: Aug. 19, 2020

(87) PCT Pub. No.: WO2019/163254
PCT Pub. Date: Aug. 29, 2019

(65) Prior Publication Data
US 2021/0008502 A1    Jan. 14, 2021

(30) Foreign Application Priority Data
Feb. 20, 2018   (JP) .............................. JP2018-027499

(51) Int. Cl.
   *B01D 65/02*      (2006.01)
   *B01F 23/231*     (2022.01)
   *B01F 33/40*      (2022.01)

(52) U.S. Cl.
   CPC ............ *B01D 65/02* (2013.01); *B01F 23/231* (2022.01); *B01D 2321/185* (2013.01); *B01F 23/231265* (2022.01); *B01F 33/409* (2022.01)

(58) Field of Classification Search
   None
   See application file for complete search history.

(56) References Cited

U.S. PATENT DOCUMENTS 3,788,616 A * 1/1974 Clough, Jr. ......... B01F 3/04531
                                                    261/64.1
4,187,263 A    2/1980 Lipert
(Continued)

FOREIGN PATENT DOCUMENTS

CN   101554568 A   10/2009
CN   106061591 A   10/2016
(Continued)

OTHER PUBLICATIONS

Chinese Office Action, Application No. 201880089797.3, dated Mar. 16, 2021, 7 pages.

*Primary Examiner* — Jonathan M Peo
(74) *Attorney, Agent, or Firm* — Foley & Lardner LLP

(57) ABSTRACT

A bubble generation device intermittently generates large bubbles in a liquid phase. The bubble generation device includes a bubble storing container, a pivot, and a pair of edge portion receivers. The bubble storing container stores bubbles generated by a gas supply nozzle in the liquid. The pivot allows the bubble storing container to pivot thereon, thereby releasing the large bubbles from the bubble storing container. The pair of edge portion receivers receives and blocks an edge portion of the bubble storing container to limit pivot of the bubble storing container. An inside of the bubble storing container is partitioned by a partition that is installed in an axial direction of the pivot.

6 Claims, 5 Drawing Sheets

(56) References Cited

U.S. PATENT DOCUMENTS

| | | | |
|---|---|---|---|
| 4,606,867 A | 8/1986 | Eguchi | |
| 8,591,738 B2 | 11/2013 | Toyooka et al. | |
| 2009/0236280 A1 | 9/2009 | Morita et al. | |
| 2013/0266456 A1* | 10/2013 | Hintz | A01K 63/042 417/54 |
| 2016/0121270 A1 | 5/2016 | Tanaka et al. | |
| 2017/0056831 A1 | 3/2017 | Tanaka et al. | |

FOREIGN PATENT DOCUMENTS

| | | |
|---|---|---|
| JP | 51-10094 A | 1/1976 |
| JP | 61-40725 A | 2/1986 |
| JP | 64-24967 A | 1/1989 |
| JP | 3-21395 A | 1/1991 |
| JP | 3-56362 U | 5/1991 |
| JP | 4-74272 U | 6/1992 |
| JP | 10-192667 A | 7/1998 |
| JP | 3451849 B2 | 9/2003 |
| JP | 2003-340250 A | 12/2003 |
| JP | 2011-143380 A | 7/2011 |
| JP | 2011-224452 A | 11/2011 |
| JP | 2013-56346 A | 3/2013 |
| JP | 2015-6654 A | 1/2015 |
| JP | 2016-47492 | 4/2016 |

\* cited by examiner

AIR BUBBLE GENERATION DEVICE

TECHNICAL FIELD

The present invention relates to a bubble generation device that generates bubbles in a liquid phase.

BACKGROUND ART

A bubble generation device that intermittently generates large bubbles in a liquid has many uses.

For example, there is taken a method for tearing off suspended matter on the surface of a separation membrane by scrubbing through shaking a treated water on the separation membrane in order to prevent clogging of the separation membrane to be used for waste water treatment. As the bubble size for scrubbing the separation membrane surface becomes larger, kinetic energy possessed by the bubble becomes greater, thereby improving the washing effect. In particular, in the case of installing planer separation membranes in parallel, it is preferable to have a diameter that is greater than at least the distance between the membrane surfaces.

As a device capable of generating large size bubbles, hitherto, there has been proposed a device capable of generating large size bubbles or a membrane separation device equipped with this. For example, it is possible to cite an intermittent air traction device for washing the membrane surface in a membrane separation device, a large-bubbles generation device for operating a biological reaction tank under oxygen-free condition, a bubble generation device for making uniform the concentration and the temperature of a waste liquid in a tank of an anaerobic digestion system, etc.

As the above-mentioned intermittent air traction device, it is possible to cite membrane separation devices and backwash devices, which are disclosed, for example, in Patent Publications 1-3.

A membrane separation device of Patent Publication 1 supplies large-size bubbles, which are high in washing effect, to a separation membrane by using a bubbles storing plate (bubbles collection means) together with a conventional air diffusing tube.

A membrane separation device of Patent Publication 2 prevents a solid component accumulation on the membrane surface by providing below the membrane member a bubble-shots releasing means that intermittently releases bubble shots turned into large bubbles by an inverted siphon action to generate an upward flow of large bubbles in flow paths in the membrane member.

A membrane separation device of Patent Publication 3 upwardly opens air reservoir cups to smoothly and intermittently release large bubbles from an air reservoir in the inside.

As the above-mentioned large-bubbles generation device, it is possible to cite a large-bubbles generation device of Patent Publication 4. This publication discloses an applied example of a waste water treatment device by a circulation-type nitrification and denitrification method by using microorganism immobilization supports. In this applied example, a large-bubbles generation device is installed in a reaction tank that is operated under oxygen-free condition, and air is diffused in the reaction tank to stir and fluidize the supports. Bubbles blown out of this large-bubbles generation device have relatively large sizes, and the amount of oxygen to be dissolved in the reaction tank is small. Therefore, the reaction tank is maintained under an oxygen-free condition that is sufficient to generate a denitrification reaction.

As the above-mentioned bubble generation device for making them uniform, it is possible to cite one disclosed in Patent Publication 5, which is equipped with a bubble generator and a stack pipe that stands relative to this bubble generator via a standpipe.

PRIOR ART PUBLICATIONS

Patent Publications

Patent Publication 1: JP Patent Application Publication 2011-224452
Patent Publication 2: JP Patent Application Publication 2003-340250
Patent Publication 3: JP Patent Application Publication Heisei 10-192667
Patent Publication 4: JP Patent 3451849
Patent Publication 5: U.S. Pat. No. 4,187,263

SUMMARY OF THE INVENTION

The membrane separation device of Patent Publication 1 is capable of generating bubbles of certain sizes by adjusting the width of the generated bubbles storing plate in the horizontal direction, but generates large bubbles by gathering small bubbles. Therefore, it is limited in terms of generating the large bubbles in a large amount at the same time.

The bubble-shots releasing means of Patent Publication 2 is capable of adjusting the gas volume by the size of the inner volume of the gas siphon chamber. It is capable of releasing a large-volume gas at one time by an inverted siphon action. The bubbles are, however, not gathered, but they are separated into those of certain sizes and are released. Therefore, similar to the device of Patent Publication 1, it is limited in terms of generating large bubbles.

The backwash device of Patent Publication 3 is capable of adjusting the size of bubbles by the size of the inner volume of the air reservoir cups. Therefore, as compared with devices of Patent Publications 1 and 2, it is easy to generate large bubbles.

However, in the case of installing a plurality of air reservoir cups below the bubble washing target, they are separated in plain. Therefore, the distance between the air reservoir cups is limited, depending on the size of each air reservoir cup. This is not suitable for generating large bubbles in a large amount in a limited specific area. For example, in the case of closely arranging planar or hollow-fiber-type separation membranes, setting of large bubbles generation points relative to the membrane module as the washing target becomes limited. Therefore, it causes a task in terms of uniformly washing the membrane module.

In the large bubbles generation device of Patent Publication 4, it says that, since the bubbles blown from this large bubbles generation device have large sizes, the amount of oxygen dissolved into the reaction tank is small, and the reaction tank is maintained under an oxygen-free condition that is sufficient for the denitrification reaction. However, this publication has no description about a specific configuration of the large bubbles generation device, and it is only disclosed as an air diffusion device to generate large-size bubbles in the reaction tank.

Since the bubble generation means of Patent Publication 5 is one using an inverted siphon action similar to the device of Patent Publication 2, it is capable of releasing gas of a large volume at once. However, the bubbles are not gathered, but they are separated into certain sizes and released.

Therefore, the bubble generation means of Patent Publication 5 is limited in terms of generating large bubbles, similar to the device of Patent Publication 1.

In view of the above-mentioned situation, it is a task of the present invention to intermittently and effectively generate large bubbles in a liquid phase.

Thus, according to one aspect of the present invention, there is provided a bubble generation device for intermittently generating large bubbles in a liquid phase, comprising a gas supply member that continuously supplies air; a bubble storing container that stores bubbles generated in the liquid phase by the gas supply member; a pivot that allows the bubble storing container to pivot thereon; and a partition that is installed in an inside of the bubble storing container and in an axial direction of the pivot and partitions the inside.

According to one aspect of the present invention, the gas supply member is equipped with a pair of edge portion receivers that receives and blocks an edge portion of the bubble storing container.

According to one aspect of the present invention, the pivot is formed on the partition in a vicinity of a lower end of the partition.

According to one aspect of the present invention, the inside of the bubble storing container has a plurality of partitions that are perpendicularly arranged to an axial direction of the pivot and further partition the inside.

According to one aspect of the present invention, a plurality of insides partitioned in a longitudinal direction of the bubble storing container communicate with each other at a top portion of the bubble storing container.

According to one aspect of the present invention, the bubble generation device is used together with a bubble diffusion prevention wall or a bubble introduction wall, each of which is arranged on a lower end side of a membrane separation device to which the bubbles are supplied, or a draft tube that circularly supplies the liquid phase.

According to the present invention as above, it is possible to intermittently and effectively generate large bubbles in a liquid phase.

BRIEF DESCRIPTION OF THE DRAWINGS

FIG. 3(*b*) is an explanatory view of a process in which bubbles are released from the one of the bubble storing chambers; FIG. 3(*c*) is an explanatory view of a process in which bubbles are stored in the other of the bubble storing chambers of the bubble generation device; and FIG. 3(*d*) is an explanatory view of a process in which bubbles are released from the other of the bubble storing chambers;

MODE FOR IMPLEMENTING THE INVENTION

In the following, embodiments of the present invention are explained with reference to the drawings.

Embodiment 1

Figure 1:
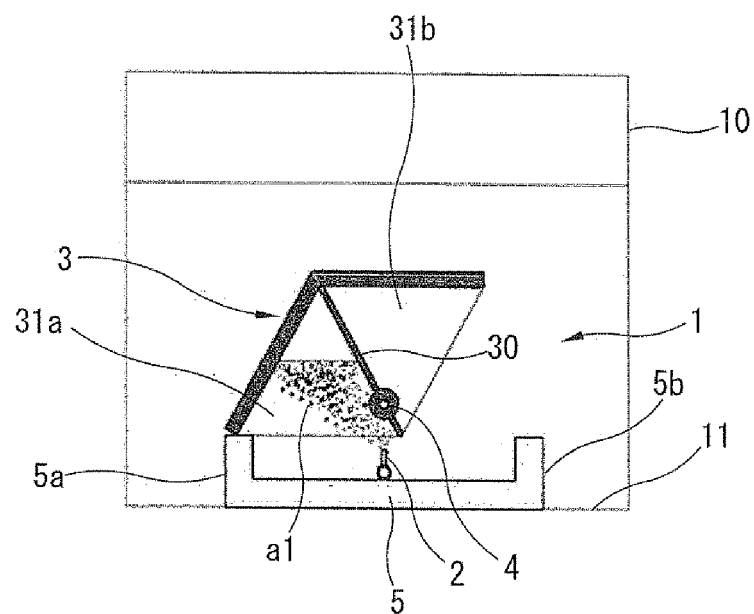
FIG. 1 is a schematic view of a bubble generation device applied to a water tank of Embodiment 1 of the present invention.

In a bubble generation device 1 of the present embodiment shown in FIG. 1, a reverse chamber-type and intermittent bubble generation-type is adopted, to intermittently generate large bubbles a2 in a liquid phase in a water tank 10.

The bubble generation device 1 is equipped with gas supply nozzles 2, a bubble storing container 3 that stores bubbles a1 generated by this gas supply nozzle 2 in the liquid phase, a pivot 4 that allows this bubble storing container 3 to pivot thereon, and a pair of edge portion receivers 5*a*, 5*b* that receives and blocks edge portions of the bubble storing container 3.

The gas supply nozzles 2 are according to one aspect of the gas supply member. As exemplarily shown in FIG. 2, in a frame body 7 installed in the water tank 10, they are generally equidistantly formed on a pipe 6 that is arranged at a position corresponding to the pivot 4 in a direction of its axial direction.

As shown in FIG. 1, the inside of the bubble storing container 3 is partitioned into bubble storing chambers 31*a*, 31*b* by a partition 30 that is installed in the direction of the pivot 4.

The pivot 4 is provided in the vicinity of the lower end of the partition 30. In particular, the reciprocating pivot of the bubble storing container 3 about the pivot 4 makes it possible to securely distribute the bubbles, which are generated by a continuous supply of air from the gas supply nozzles 2, into the bubble storing chambers 31*a*, 31*b*.

The edge portion receivers 5*a*, 5*b* receive and block the edge portions of the bubble storing container 3 to limit the reciprocating pivot of the bubble storing container 3. As shown in FIG. 1, the edge portion receivers 5*a*, 5*b* are formed of edge portions of a shallow member 5 with a generally U-shaped section, which is arranged at a position just under the bubble storing container 3 on a bottom portion 11 of the water tank 10.

It suffices for the member 5 to stop the reciprocating pivot of the bubble storing container 3 at a predetermined position. Therefore, it is optional to use a plate member to fix the bubble supply member or an installation surface of the bubble generation device 1.

The container material and the inner volume of the bubble storing container 3 are selected and designed by considering a balance between buoyancy of the bubble storing container 3 in the water to be treated (in a condition in which one half of the bubble storing container 3 is filled with air by 100%) and mass of the container material.

Figure 2:
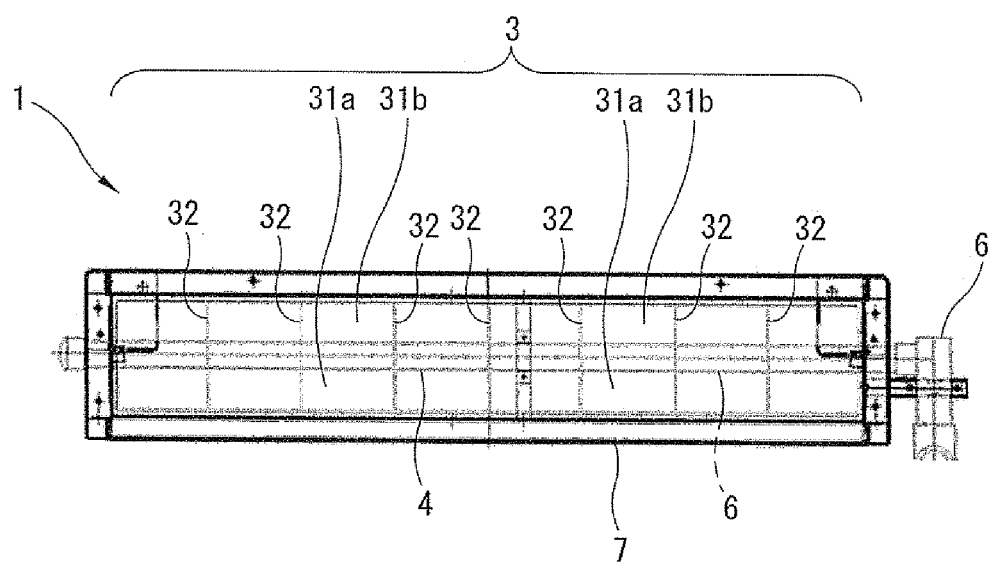
FIG. 2 is a plan view of the bubble generation device.

Furthermore, as shown in FIG. 2, the bubble storing container 3 is made long in the direction of the side surfaces. With this, it can also be applied to a membrane separation device 20, exemplarily shown in FIG. 4, particularly to a mode with depth.

In this case, as shown in FIG. 2, in the inside of the bubble storing container 3, there are further provided a plurality of partitions 32 that partition the space of the bubble storing chambers 31*a*, 31*b* in a condition in which they are perpendicularly arranged to the axial direction of the pivot 4. With this, a pair of the bubble storing chambers 31*a*, 31*b* is formed in a plural number along the longitudinal direction of the bubble storing container 3. Then, at least one gas supply nozzle 2 is arranged relative to a pair of bubble storing chambers 31*a*, 31*b*. In this way as the bubble storing container is further partitioned, it is possible to uniformly supply bubbles in plane.

Furthermore, the bubble storing chambers 31*a*, 31*b* of the inside are each partitioned into a plural number in a longitudinal direction of the bubble storing container 3, and they are communicate with each other at a top portion of the bubble storing container 3. That is, the adjacent bubble storing chambers 31*a* in the longitudinal direction communicate with each other at the top portion in the bubble storing container 3 by a hole (not shown in the drawings) formed through the partition 32. Similarly, the adjacent bubble storing chambers 31*b* in the longitudinal direction communicate with each other at the top portion in the bubble storing container 3 by a hole (not shown in the drawings) formed through the partition 32. In such mode, it becomes possible to uniformly store bubbles in a pair of bubble storing chambers 31*a*, 31*b*, and it is possible to uniformly supply bubbles in plane.

Figure 3:
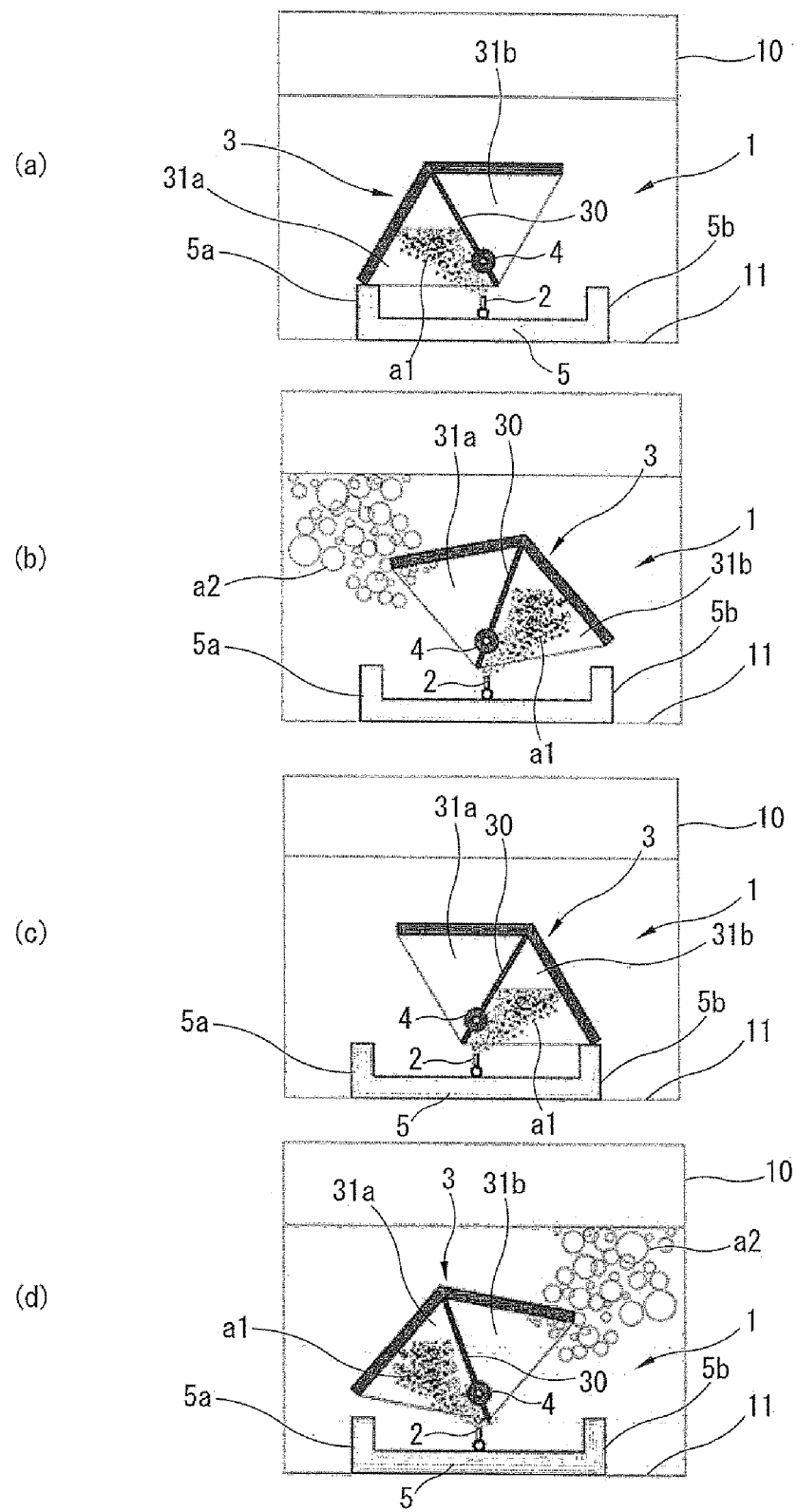
FIG. 3(*a*) is an explanatory view of a process in which bubbles are stored in one of bubble storing chambers of the bubble generation device.

With reference to FIG. 3, an operation example of the bubble generation device 1 of the present embodiment is explained.

Firstly, as shown in FIG. 3(*a*), bubbles a1 generated in the liquid phase in the water tank 10 by supplying air from the gas supply nozzle 2 are introduced into the bubble storing chamber 31*a* of the bubble storing container 3 supported on one edge portion receiver 5*a*, thereby starting storing of bubbles.

Then, as the bubble storing chamber 31*a* becomes filled with bubbles a1, as shown in FIG. 3(*b*), the bubble storing container 3 pivots toward the other edge portion receiver 5*b* by buoyancy to be generated in the bubble storing chamber 31*a* and the self-weight of the bubble storing chamber 31*b*. In this process, the bubbles a1 stored in the bubble storing chamber 31*a* are released from the bubble storing chamber 31*a* as large bubbles a2 larger than the bubbles a1.

Strength and frequency of the flow by releasing the large bubbles a2 from the bubble generation device 1 can be adjusted by selecting the volume of the bubble storing container 3 and the gas supply rate from the gas supply nozzle 2.

On the other hand, the bubbles a1 generated by the air supply from the gas supply nozzle 2 are supplied to the bubble storing chamber 31*b*. Then, as shown in FIG. 3(*c*), there starts the storing of the bubbles a1 into the bubble storing chamber 31*b* of the bubble storing container 3, which is supported on the other edge portion receiver 5*b*.

Then, as shown in FIG. 3(*d*), as the bubble storing chamber 31*b* becomes filled with bubbles a1, the bubble storing container 3 pivots toward the edge portion receiver 5*a* by buoyancy to be generated in the bubble storing chamber 31*b* and the self-weight of the bubble storing chamber 31*a*. In this process, the bubbles a1 stored in the bubble storing chamber 31*b* are released from the bubble storing chamber 31*b* as large bubbles a2 larger than the bubbles a1. On the other hand, the bubbles a1 generated by the air supply from the gas supply nozzle 2 are supplied to the bubble storing chamber 31*a*.

Then, as shown in FIG. 3(*a*), there starts the storing of the bubbles a1 into the bubble storing chamber 31*a* of the bubble storing container 3, which is supported on the edge portion receiver 5*a*. Then, as the bubble storing chamber 31*a* becomes filled with the bubbles a1, as mentioned above, the bubble storing container 3 pivots toward the other edge portion receiver 5*b*. In this process, as shown in FIG. 3(*b*), the bubbles a1 stored in the bubble storing chamber 31*a* are released from the bubble storing chamber 31*a* as large bubbles a2 larger than the bubbles a1.

As mentioned above, the bubble generation device 1 of the present embodiment can intermittently and effectively generate in a liquid phase large bubbles a2 which have relatively large sizes. In particular, as the space in the bubble storing container 3 is partitioned into a plural number, it becomes easy to set up the bubble generation points in plane. Furthermore, this makes it possible to intermittently and uniformly supply large bubbles a2. Then, this advantageous effect is further improved, if combined with another member, for example, the after-mentioned bubble diffusion prevention wall, bubble introduction wall, draft tube, etc.

Then, the bubble generation device 11 can be used for an intermittent air traction device for washing the membrane surface in a membrane separation device, a device that stirs the inside of a biological reaction tank for operating the tank in oxygen-free condition, a stirring device that stirs to make the concentration and the temperature in an anaerobic tank uniform.

Embodiment 2

Figure 5:
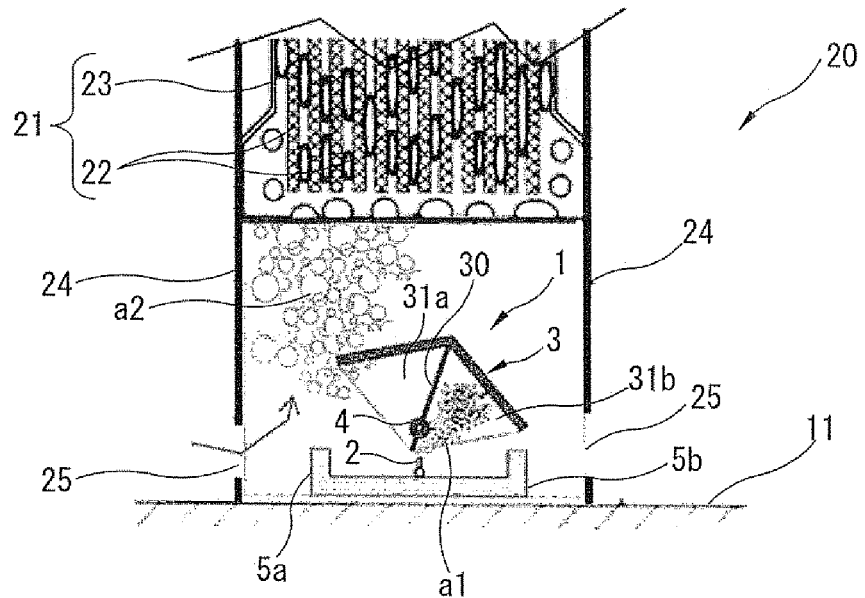
FIG. 5 is an explanatory view of an operation example of the bubble generation device applied to a membrane separation device of Embodiment 2 of the present invention.

As shown in FIG. 5, the bubble generation device 1 can also be used together with a bubble diffusion prevent wall 24 of a membrane separation device 20.

Figure 4:
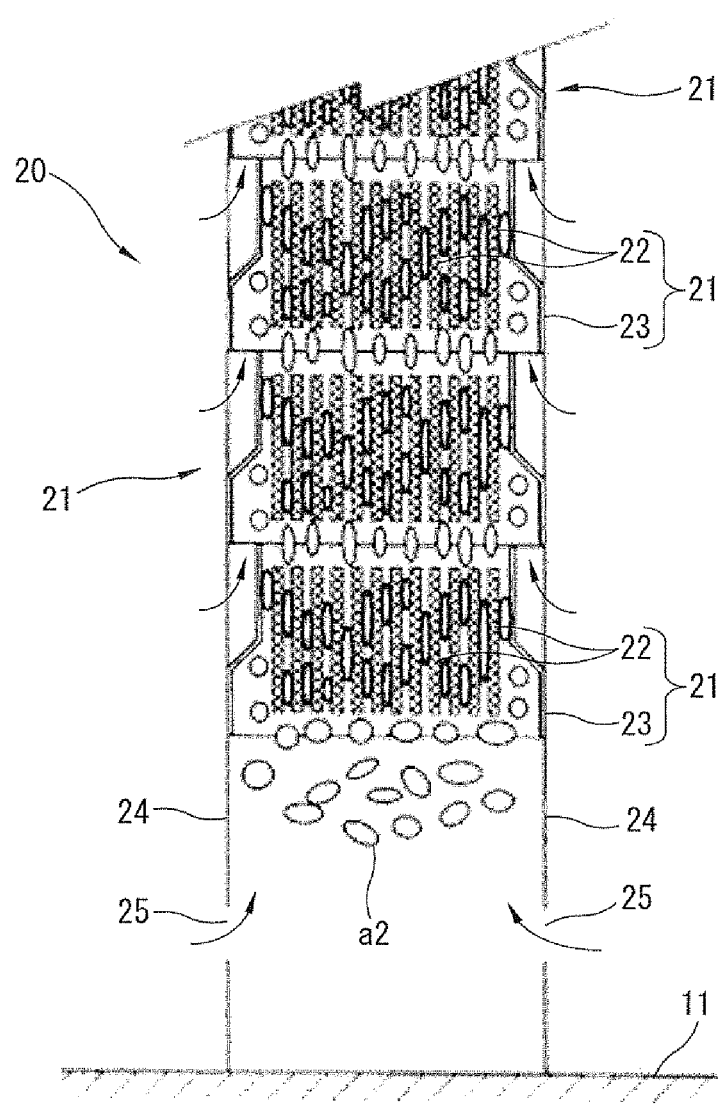
FIG. 4 is a schematic view of an example of a membrane separation device to which the bubble generation device is applied.

The membrane separation device 20 is, for example, a membrane separation device based on Patent Publication 1. As shown in FIG. 4, a plurality of membrane modules 21 are stacked in height direction.

The membrane module 21 is equipped with a plurality of planer separation membranes 22 to be arranged in parallel, and a pair of water flow guides 23 that are arranged to be parallel with the outermost separation membranes 22 of these separation membranes 22.

The membrane separation device 20 is formed at the lower end of the membrane module 21 arranged at the lowest layer, with a pair of bubble diffusion prevention walls 24. The bubble diffusion prevention wall 24 prevents a diffusion of the large bubbles a2, which have been released from the bubble generation device 1 in the vicinity of the lower end in the membrane separation device 20, to the outside of the membrane separation device 20. Furthermore, the membrane separation device 20 introduces liquid phase from opening portions 25 on the lower end side of the bubble diffusion prevention walls 24.

As shown in FIG. 5, the bubble generation device 1 of the present embodiment is arranged at the bottom portion 11 of the water tank 10 in the vicinity of the opening portions 25 of the membrane separation device 20 in the vicinity of the lower end of the bubble diffusion prevention walls 24.

As mentioned above, as the bubble generation device 1 is used together with the bubble diffusion prevention walls 24 of the membrane separation device 20, it becomes possible to prevent dissipation of the large bubbles a2 released from the bubble generation device 1 and to intermittently and alternately concentrate bubbles at particular regions in the membrane separation device 20. Therefore, in the membrane separation device 20, it is possible to more effectively generate the large bubbles a2, thereby improving the washing effect of the separation membranes 22.

Strength and frequency of the flow by releasing the large bubbles a2 by the bubble generation device 1 of Embodiment 2 can also be adjusted by selecting the volume of the bubble storing container 3 and the gas supply rate from the gas supply nozzle 2.

The bubble generation device 1 is applied, in place of an air diffusion device of a conventional membrane separation device. The present invention is, however, not limited to this mode. It can also be applied to the case of installing in a reaction tank to be operated under oxygen-free condition and then diffusing air in the reaction tank and to the case of stirring the inside of a tank of an anaerobic digestion system.

Embodiment 3

Figure 6:
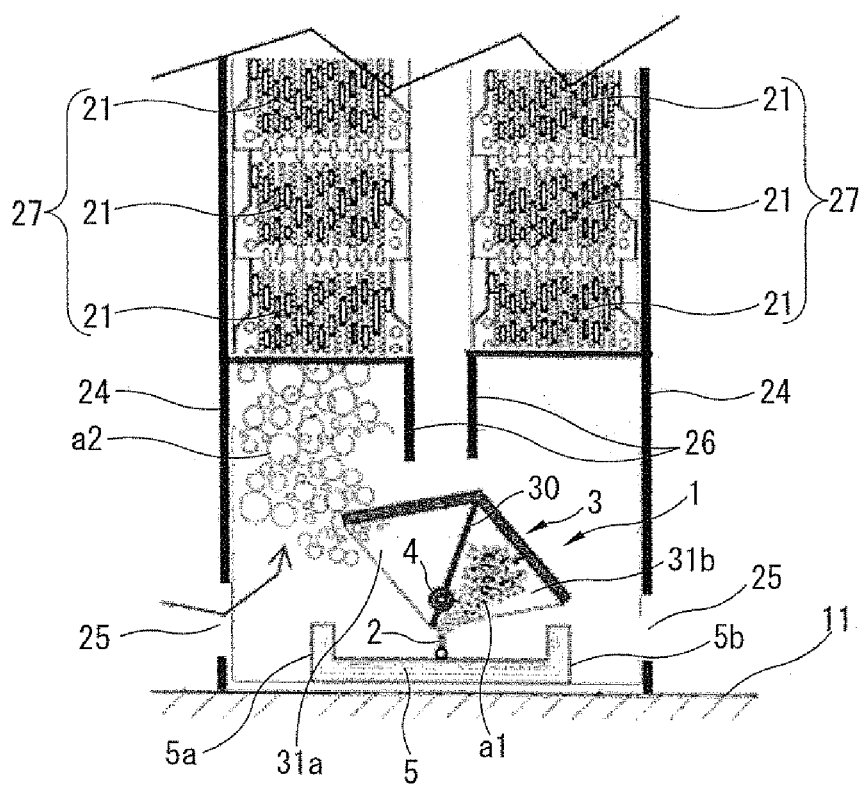
FIG. 6 is an explanatory view of an operation example of the bubble generation device applied to a membrane separation device of Embodiment 3 of the present invention.

The bubble generation device 1 of the present embodiment shown in FIG. 6 is used together with bubble introduction walls 26 in the mode of Embodiment 1, thereby intermittently, alternately, and intensively supplying the large bubbles a2 to particular regions in the membrane separation device 20.

That is, the membrane separation device 20 of the present embodiment is equipped with parallel stacked bodies 27 of the membrane modules 21. These parallel stacked bodies 27 are equipped at the lower ends of their outside surfaces with a pair of bubble diffusion prevention walls 24. On the other hand, the parallel stacked bodies 27 in the membrane separation device 20 are equipped at the lower ends of their side surfaces with a pair of bubble introduction walls 26 that guides the large bubbles a2 released from the bubble generation device 1 toward the lower ends of the stacked bodies 27. The bubble introduction wall 26 is formed to be shorter than the bubble diffusion prevention wall 24 in terms of total length.

As shown in the same drawing, the bubble generation device 1 of the present embodiment is arranged at the bottom portion 11 of the water tank 10 in the vicinity of the opening portions 25 of the membrane separation device 20 in the vicinity of the lower ends of the bubble introduction walls 26.

As mentioned above, according to the membrane separation device 20 equipped with the bubble generation device 1, dissipation of the large bubbles a2 released from the bubble generation device 1 is prevented by the bubble diffusion prevention walls 24.

Furthermore, as the large bubbles a2 are guided into particular regions in the membrane separation device 20 by the bubble introduction walls 26, it becomes possible to intermittently, alternately and intensively supply the large bubbles a2. Furthermore, since it forms regions that are not affected each other by the flows of the large bubbles a2, air diffusion to two sets of air diffusion targets becomes possible by singly providing the bubble generation device 1.

Similar to Embodiment 2, strength and frequency of the flow by releasing the large bubbles a2 by the bubble generation device 1 can be adjusted by selecting the volume of the bubble storing container 3 and the gas supply rate from the gas supply nozzle 2.

Embodiment 4

The bubble generation device 1 can be applied as a stirring device of an anaerobic tank or oxygen-free tank of a sewage-treatment plant.

Figure 7:
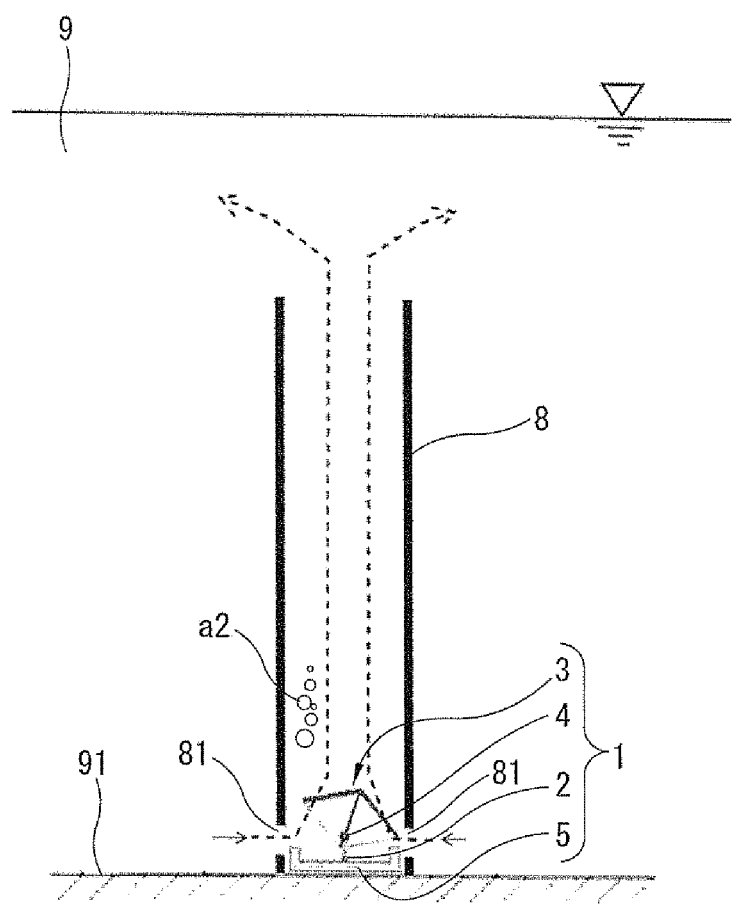
FIG. 7 is an explanatory view of an operation example of the bubble generation device applied to a draft tube of Embodiment 4 of the present invention.

The bubble generation device 1 of Embodiment 4, which is exemplarily shown in FIG. 7, is applied as a water flow generation means in a draft tube 8 to be arranged in an anaerobic tank or an oxygen-free tank.

The draft tube 8 is vertically arranged at a bottom portion 91 of an anaerobic tank or an oxygen-free tank. The bubble generation device 1 is arranged at the bottom portion 91 in the draft tube 8 in the vicinity of opening portions 81 formed on a lower end side of the draft tube 8. The bubble generation device 1 is not limited in terms of its installation height, etc. as long as it is installed in the draft tube 8.

In case that the bubble generation device 1 is applied to an anaerobic tank, a digestion gas to be generated in the anaerobic tank or a gas of the same quality is used as the supply gas to the gas supply nozzles 2. The large bubbles a2 of the digestion gas released from the bubble storing container 3 of the bubble generation device 1 move upward in the draft tube 8 with flows in the liquid phase 9 shown by dotted lines, which are circularly supplied from the opening portions 81 of the draft tube 8, and then are discharged from an upper end opening portion of the draft tube 8.

In case that the bubble generation device 1 is applied as a stirring device of an oxygen-free tank, the supply gas to the gas supply nozzles 2 is air. This air is stored in the bubble storing container 3 of the bubble generation device 1 and then intermittently released as the large bubbles a2 from the bubble storing container 3. The large bubbles a2 move with the flow of the liquid phase 9 shown by the dotted lines, which is circularly supplied from the opening portions 81 of the draft tube 8, and then released from an upper end opening portion of the draft tube 8. Such circular supply of the liquid phase 9 through the draft tube 8 equipped with the bubble generation device 1 causes a small amount of oxygen to be dissolved into the reaction tank, and the reaction tank can maintain an oxygen-free condition optimum for denitrification reaction.

Similar to Embodiments 2 and 3, strength and frequency of the flow by releasing the large bubbles a2 by the bubble generation device 1 of the present embodiment can be adjusted by selecting the volume of the bubble storing container 3 and the gas supply rate from the gas supply nozzle 2.

The draft tube 8 is used in the present embodiment. The draft tube 8, however, becomes unnecessary, as long as it is possible to obtain the required liquid-phase flow by selecting the volume and the number of the bubble storing container 3 of the bubble generation device 1 and by adjusting the rate of gas supply from the gas supply nozzles 2.

The invention claimed is:

1. A bubble generation device for intermittently generating bubbles in a liquid phase of a tank, comprising:
   a gas supply member that continuously supplies air;
   a bubble storing container that stores the bubbles generated in the liquid phase by the gas supply member;
   a pivot that allows the bubble storing container to reciprocatingly pivot thereon;
   a first partition, that is installed in an inside of the bubble storing container and in an axial direction of the pivot, and partitions the inside into first and second bubble storing chambers into which the bubbles are distributed by the reciprocatingly pivoting of the bubble storing container, an upper end of the first partition being fixed to a top portion of the bubble storing container; and
   first and second edge portion receivers that respectively receive and block first and second edge portions of the bubble storing container allowed to reciprocatingly pivot,
   wherein the first edge portion receiver extends upward from a bottom surface of the tank to have a first height such that, when the first edge portion receiver receives and blocks the first edge portion of the bubble storing container, the bubbles are introduced into only the first bubble storing chamber, wherein the second edge portion receiver extends upward from the bottom surface of the tank to have a second height such that, when the second edge portion receiver receives and blocks the second edge portion of the bubble storing container, the bubbles are introduced into only the second bubble storing chamber, wherein the pivot is formed on the first partition in a vicinity of a lower end of the first partition, in a range between the upper and lower ends of the first partition.

2. The bubble generation device as claimed in claim 1, wherein the inside of the bubble storing container has a plurality of second partitions that are perpendicularly arranged to the axial direction of the pivot and further partition the inside.

3. The bubble generation device as claimed in claim 2, wherein a plurality of insides partitioned in a longitudinal direction of the bubble storing container communicate with each other at the top portion of the bubble storing container.

4. A system comprising the bubble generation device as claimed in claim 1, and further comprising a bubble diffusion prevention wall or a bubble introduction wall, each of which is arranged on a lower end side of a membrane separation device to which the bubbles are supplied, or a draft tube that circularly supplies the liquid phase.

5. A bubble generation device for intermittently generating bubbles in a liquid phase, comprising:
- a gas supply member that continuously supplies air from a plurality of nozzles;
- a bubble storing container that stores the bubbles generated in the liquid phase by the gas supply member;
- a pivot that allows the bubble storing container to reciprocatingly pivot thereon;
- a first partition, that is installed in an inside of the bubble storing container and in an axial direction of the pivot, and partitions the inside into first and second bubble storing chambers into which the bubbles are distributed by the reciprocatingly pivoting of the bubble storing container, an upper end of the first partition being fixed to a top portion of the bubble storing container; and
- a plurality of second partitions that are perpendicularly arranged to the axial direction of the pivot in the inside of the bubble storing container, partition the first bubble storing chamber into a plurality of first sub-chambers, and partition the second bubble storing chamber into a plurality of second sub-chambers, wherein the first sub-chambers partitioned in a longitudinal direction of the bubble storing container communicate with each other at the top portion of the bubble storing container, wherein the second sub-chambers partitioned in the longitudinal direction of the bubble storing container communicate with each other at the top portion of the bubble storing container, at least one nozzle of the plurality of nozzles is arranged relative to a pair of the first and second sub-chambers that are opposed to each other in a direction perpendicular to the axial direction of the pivot, such that the bubbles are introduced from the at least one nozzle into the pair of the first and second sub-chambers by the reciprocatingly pivoting of the bubble storing container, wherein the pivot is formed on the first partition in a vicinity of a lower end of the first partition, in a range between the upper and lower ends of the first partition.

6. A system comprising the bubble generation device as claimed in claim 5, and further comprising a bubble diffusion prevention wall or a bubble introduction wall, each of which is arranged on a lower end side of a membrane separation device to which the bubbles are supplied, or a draft tube that circularly supplies the liquid phase.

* * * * *